United States Patent
Falk et al.

(10) Patent No.: US 9,614,820 B2
(45) Date of Patent: Apr. 4, 2017

(54) METHOD AND SYSTEM FOR THE MANIPULATION-PROTECTED GENERATION OF A CRYPTOGRAPHIC KEY

(75) Inventors: Rainer Falk, Erding (DE); Florian Kohlmayer, Starnberg (DE); SIEMENS AKTIENGESELLSCHAFT, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1373 days.

(21) Appl. No.: 12/298,694

(22) PCT Filed: Feb. 8, 2007

(86) PCT No.: PCT/EP2007/051191
§ 371 (c)(1),
(2), (4) Date: Oct. 27, 2008

(87) PCT Pub. No.: WO2007/124965
PCT Pub. Date: Nov. 8, 2007

(65) Prior Publication Data
US 2009/0103733 A1    Apr. 23, 2009

(30) Foreign Application Priority Data
Apr. 26, 2006 (DE) .................. 10 2006 019 466

(51) Int. Cl.
*H04L 9/08* (2006.01)
*H04L 29/06* (2006.01)
*H04W 12/04* (2009.01)

(52) U.S. Cl.
CPC .......... *H04L 63/061* (2013.01); *H04L 9/0841* (2013.01); *H04L 63/1416* (2013.01); *H04W 12/04* (2013.01); *H04L 2209/805* (2013.01)

(58) Field of Classification Search
CPC .................................................. H04L 63/061
(Continued)

(56) References Cited

U.S. PATENT DOCUMENTS 5,450,493 A    9/1995    Maher
7,047,404 B1 *  5/2006    Doonan et al. ............... 713/156
(Continued)

FOREIGN PATENT DOCUMENTS

JP    2003-229847    8/2003
JP    2006-25374     1/2006
(Continued)

OTHER PUBLICATIONS

European Office Action, issued in corresponding European Patent Application 07 704 444.4.
(Continued)

*Primary Examiner* — William Powers
(74) *Attorney, Agent, or Firm* — Slayden Grubert Beard PLLC

(57) ABSTRACT

The embodiments relate to a near field communication system including a plurality of near field communication devices which communicate with each other via a radio interface. During generation of a common cryptographic key between the near field communication devices of the near field communication system, at least one of the two near field communication devices monitors during generation of the cryptographic key via the radio interface in a generation period whether an additional near field communication device which could be a potential active attacker communicates with one of the near field communication devices via the radio interface. If such a suspicious type of communication is detected, generation of the common cryptographic key is optionally terminated.

13 Claims, 4 Drawing Sheets

(58) Field of Classification Search
USPC .............. 713/171; 380/44, 270, 277; 726/23
See application file for complete search history.

(56) References Cited

U.S. PATENT DOCUMENTS

| | | | |
|---|---|---|---|
| 7,375,616 B2* | 5/2008 | Rowse et al. ................. | 340/10.1 |
| 8,082,443 B2* | 12/2011 | Troxel et al. ................. | 713/168 |
| 8,564,408 B2 | 10/2013 | Rowse et al. | |
| 2003/0065918 A1 | 4/2003 | Willey | |
| 2003/0232598 A1 | 12/2003 | Aljadeff et al. | |
| 2004/0028016 A1* | 2/2004 | Billhartz ....................... | 370/338 |
| 2005/0010536 A1 | 1/2005 | Cochran | |
| 2005/0010680 A1 | 1/2005 | Zick et al. | |
| 2005/0128989 A1* | 6/2005 | Bhagwat et al. ............. | 370/338 |
| 2005/0172972 A1 | 8/2005 | Nikolchev et al. | |
| 2006/0031675 A1 | 2/2006 | Zhang et al. | |
| 2007/0147618 A1 | 6/2007 | Horn | |

FOREIGN PATENT DOCUMENTS

| | | |
|---|---|---|
| RU | 2 187 897 C2 | 8/2002 |
| RU | 2 230 438 C2 | 6/2004 |
| WO | 2005/004438 A1 | 1/2005 |
| WO | 2005/107141 A1 | 11/2005 |
| WO | 2007/124965 A1 | 11/2007 |

OTHER PUBLICATIONS

C.-Y.Tseng, P. Balasubramanyam, C.Ko, R. Limprasittiporn, J. Rowe, K. Levitt: "A specification-based intrusion detection system for AODV", Proceedings of the 1st ACM Workshop on Securitiy of Ad Hoc and Sensor Networks, 2003, pp. 125-134.
T. Zhiqi, A.B. Ruighaver: "Wireless Intrusion Detection: Not as easy as traditional network intrusion detection", 2005 IEEE Region 10 Conference, Nov. 2005; Others.
W.Xu, W. Trappe, Y. Zhang, T. Wood: "The feasibility of launching and detecting jamming attacks in wireless network", Proceedings of the 6th ACM international symposium on mobile ad hoc networking and computing, 2005, pp. 46-57; Others.
Chinese Office Action mailed May 29, 2014 in corresponding Chinese Application No. 200780014690.4 along with German Translation.
Indian Office Action dated Nov. 5, 2014 in corresponding Indian Patent Application No. 8364/DELNP/2008.
Korean Notice of Allowance dated Sep. 25, 2014 in corresponding Korean Patent Application No. 10-2008-7028789.

* cited by examiner

METHOD AND SYSTEM FOR THE MANIPULATION-PROTECTED GENERATION OF A CRYPTOGRAPHIC KEY

CROSS REFERENCE TO RELATED APPLICATIONS

This application is based on and hereby claims priority to German Application No. 10 2006 019 466.7 filed on Apr. 26, 2006, the contents of which are hereby incorporated by reference.

BACKGROUND

The embodiments herein relate to a method and a system for manipulation-protected generation of a common cryptographic key between two nodes via a radio interface.

In near-field communication systems, such as Bluetooth, WLAN, ZigBee or WiMax, terminals communicate with each other via a radio interface. To protect the information transmitted via the radio interface against manipulation or eavesdropping by third parties the information is transmitted between the nodes or terminals of the near field communication systems in encrypted form. To do this it is necessary for the terminals or nodes to create a common cryptographic key.

With near field radio systems end users must create the cryptographic key themselves and are not supported by any network operator in doing so. For private end users the configuration or the creation of a cryptographic key is cumbersome and prone to errors. Many end users have a tendency to create easily recognizable keys or passwords, for example "1234", which can be discovered relatively easily by third parties.

Conventional security protocols are known for the creation of a common cryptographic key, which create a secret key which is only known to those actively involved in the protocol execution sequence, but not however to an external passive, i.e. only eavesdropping, attacker. Two known security protocols are the security protocol according to Diffie-Hellman for key negotiation and an anonymous, non-authenticatable variant of the SSL/TLS (Secure Source Layer/Transport Layer Security) security protocol.

Key negotiation according to Diffie Hellman allows a key to be negotiated over an insecure channel. In such cases two subscribers A, B know two public values, a module value m, i.e. a large prime number, and an integer g.

In the key negotiation A initially computes a large random number a and subsequently computes $X=g^a$ mod m. The other subscriber B computes a large random number b and computes $Y=g^b$ mod m.

After subscriber A has sent the computed value X to the other subscriber B, this subscriber B computes a value $W1=X^b$ mod m.

The subscriber B sends the computed value Y to the subscriber A. Subsequently the subscriber A computes the value $W2=Y^a \cdot$ mod m. The values W1, W2 computed by the two subscribers A, B are $g^{ab}$ mod m. The computed values W1, W2 represent the common secret key of the two subscribers A, B. This negotiated key S cannot be created by a third party without the knowledge of A, B. The reversal of the exponentiation executed by A, B demands an extremely large number of computing steps and takes a correspondingly long time. This characteristic ensures the secrecy of the negotiated common key W1=W2=S.

A common cryptographic key S negotiated in this way is safe from passive attacks by third parties, i.e. safe from eavesdropping by third parties. However, such creation of a secret key is not secure against an active attacker (man-in-the-middle), who manipulates the communication between the two subscribers when the key negotiation runs without authentication. It is then namely possible for a "constructed" message not to originate from the supposed sender but from an unauthorized third party. The receiver of the message is not in a position to notice this difference.

FIG. 1 shows a schematic diagram of an active attack by a third node during creation of a common cryptographic key S between two nodes K1, K2 in a conventional key negotiation protocol. The attacker A attempts, for example, to influence the execution sequence or the order of the messages exchanged in accordance with the security protocol such that, after execution of the security protocol, a security relationship between the first node K1 and the attacker A and a further security relationship between the second node K2 and the attacker A is configured, so that the attacker A is linked without being noticed by the two nodes K1, K2 into communication between the two nodes K1, K2 (man-in-the-middle).

SUMMARY

It is an aspect of the embodiments to create a method and a system for manipulation-protected creation of a common cryptographic key between two nodes via a radio interface which also offer effective protection against the use of a non-authenticated key negotiation protocol.

The embodiments create a method for manipulation-protected creation of a common cryptographic key between two nodes over a radio interface, with at least one of the two nodes monitoring within a creation period during the creation of the common cryptographic key whether a third node is communicating with one of the two nodes over the radio interface.

With the method a radio monitoring function is provided for detection of the possible presence of an active attacker (man-in-the-middle). Since the active attacker must communicate with both nodes, the distance between the nodes to be configured is small and the attacker communicates over a radio channel with the two nodes, an active attacker cannot manipulate the communication between the two nodes without the provided function noticing that the active attacker is involved as a third node.

The method thus combines a cryptographic security function with a non-cryptographic function monitoring method during the creation of a common cryptographic key, which is secure against active attackers.

In a first embodiment the monitoring node aborts the creation of the common cryptographic key with the other node if the monitoring node detects that a third node is communicating via the radio interface with one of the two nodes.

In an alternate embodiment the monitoring node does not abort the creation of the common cryptographic key with the other node when a third node communicates over the radio interface with one of the two nodes, however the configured cryptographic key is stored as an insecure key.

In an embodiment of the method the monitoring node monitors one or more radio channels of the radio interface.

In a further embodiment of the method the two nodes create the common cryptographic key in accordance with a predetermined key negotiation protocol by exchanging predefined key negotiation messages over at least one radio channel of the radio interface.

The monitoring node monitors in a preferred embodiment of the method whether key negotiation messages are being sent by a third node to one of the two nodes via the radio interface.

In an embodiment of the method the monitoring node monitors whether a warning message is being sent by another node.

In an embodiment of the method the monitoring node monitors whether a radio channel quality drops during the creation of the cryptographic key in the creation period.

In an embodiment of the method the monitoring node additionally monitors whether a third node is communicating during guard times before and after the creation period with one of the two nodes over the radio interface.

In an embodiment of the method the nodes are embodied by near field communication devices.

The embodiments further create a near field communication system with a number of near field communication devices which communicate with one another over a radio interface with, during creation of a common cryptographic key between two near field communication devices of the near field communication system, at least one of the two near field communication devices monitoring during the creation of the cryptographic key via the radio interface in a creation period whether a further near field communication device is communicating with one of the two near field communication devices via the radio interface.

The embodiments further create a near field communication device which, during creation of a common cryptographic key with another near field communication device over a radio interface, monitors this radio interface to detect manipulation by detecting whether, during the creation of the common cryptographic key, a third near field communication device is communicating with one of the two near field communication devices over a radio interface.

Embodiments of the method and of the near field communication system are described below with reference to the enclosed figures to explain features of importance thereof.

BRIEF DESCRIPTION OF THE DRAWINGS

These and other aspects and advantages will become more apparent and more readily appreciated from the following description of the exemplary embodiments, taken in conjunction with the accompanying drawings of which.

The figures are as follows.

DETAILED DESCRIPTION OF THE PREFERRED EMBODIMENT

Figure 1:
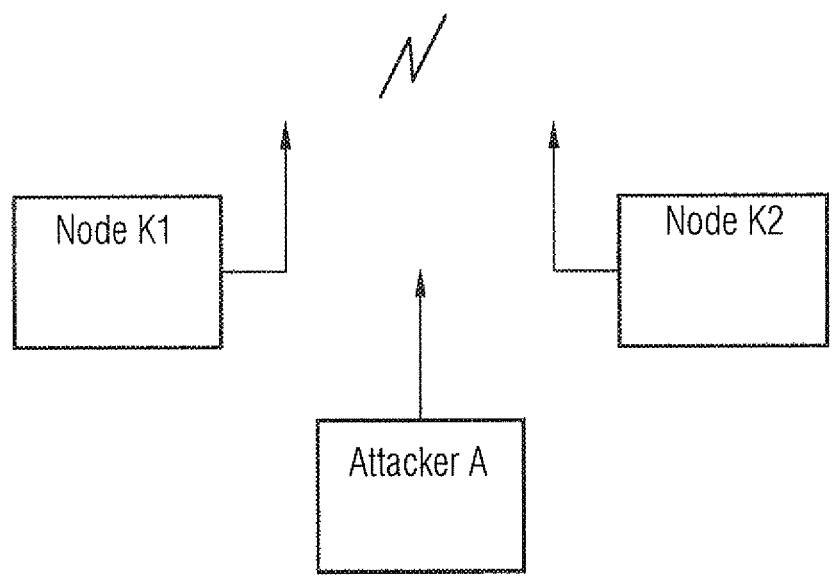
FIG. 1 is a diagram to illustrate the underlying problem.

Reference will now be made in detail to the preferred embodiments, examples of which are illustrated in the accompanying drawings, wherein like reference numerals refer to like elements throughout.

Figure 2:
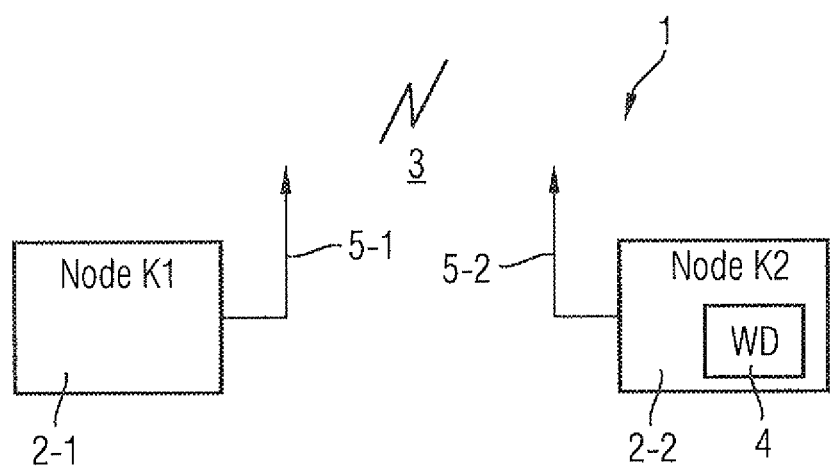
FIG. 2 is a block diagram of a near field communication system with two near field communication devices with a watchdog monitoring function.

As can be seen from FIG. 2, a near field communication system 1 can have at least two near field communication devices or nodes 2-1, 2-2. The near field communication devices 2-1, 2-2 communicate with each other by means of transmit/receive antennas 5-1, 5-2 via a radio interface 3. At least one of the two near field communication devices or nodes has a watchdog (WD) monitoring function. During creation of a common cryptographic key between the two near field communication devices 2-1, 2-2 of the near field communication system 1 the near field communication device 2-2 which contains a watchdog unit 4 monitors the creation of the cryptographic key via the radio interface 3 in a predetermined creation period to see whether a further near field communication device is communicating with one of the two near field communication devices 2-1, 2-2 over the radio interface 3.

Figure 3:
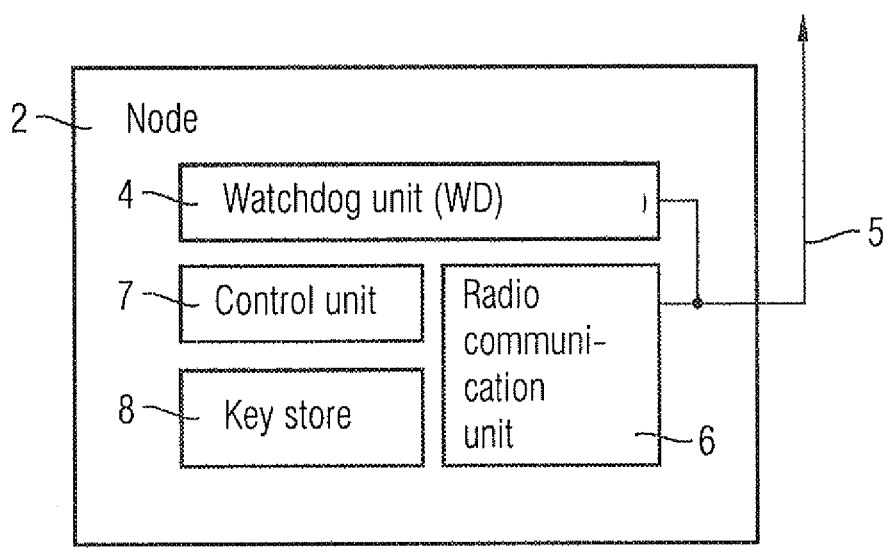
FIG. 3 is a block diagram of an embodiment of a near field communication device with watchdog function employed in the near field communication system.

FIG. 3 shows a schematic block diagram of an embodiment of a near field communication device or node 2, as is used in the near field communication system 1. The node 2 has a watchdog unit 4 which monitors radio signals transmitted over the radio interface 3. The node 2 features a transmit/receive antenna 5 for emitting and for receiving radio signals. The transmit/receive antenna 5 is connected on the one hand to the watchdog unit 4 and on the other hand to a watchdog unit 6 of the node 2. The watchdog unit 6 contains a transmit and a receive device for emitting and receiving radio signals. In one embodiment the watchdog unit 4 can also be realized as part of the watchdog unit 6. In an alternate embodiment the watchdog unit 4 has its own separate transmit/receive antenna. The near field communication device 2 preferably also has a control unit 7 in which a program executes according to the method. The near field communication device 2 contains a memory 8 for storing a created cryptographic key, which will be used for encryption of messages.

As can be seen from FIG. 2 not all near field communication devices 2 or nodes 2 of the near field communication system 1 have to contain a near field communication device 4, but only at least one of the two nodes wishing to negotiate a common cryptographic key. If the watchdog unit 4 of the monitoring node 2-2 for creation of the common cryptographic key detects that a third node is communicating via the radio interface 3 with one of the two nodes 2-2, in a first embodiment of the method the creation process is aborted by the control unit 7 of the monitoring node 2-2. In an alternate embodiment, to detect the third-party node, the monitoring node 2-2 does not abort the creation of the common cryptographic key; however the created cryptographic key is stored in each case as "insecure" in the two key stores 8 of the two nodes 2-1, 2-2. If communication by a third node over the radio interface 3 with one of the two nodes 2-1, 2-2 is detected by the watchdog unit 4 of the monitoring node 2-2, in an embodiment the monitoring node 2-2 sends out an error message and transmits the message via the radio interface 3. In the method the creation of the common cryptographic key between the two nodes 2-1, 2-2 over the radio interface 3 is undertaken in accordance with a predetermined key negotiation protocol, in which predefined key negotiation messages are exchanged over at least one radio channel of the radio interface 3 between the nodes 2-1, 2-2. This key negotiation protocol for example involves a Diffie-Hellman key negotiation protocol or an SSL/DLS key negotiation protocol. These two key negotiation protocols are non-authenticating key negotiation protocols, i.e. a node which receives messages does not have the option of securely establishing the transmitter from which the message originates.

To enhance protection, in the method, a non-authenticating key negotiation protocol can be followed by an authentication by means of a PIN number. In an alternate embodiment, to increase protection after negotiation of the common cryptographic key, the user compares at both near field communication devices the created cryptographic key or its hash value or the cryptographic key displayed by a near field communication device is entered at the other node or near field communication device. The method uses the watchdog function to enhance the security of creation of the common cryptographic key between two near field communication devices. If a non-authenticating key negotiation protocol is used, in the method the entry of a PIN number or of a password or the checking of the created common key by the user can be dispensed with. However, as an alternative, it is possible in addition to the watchdog function, to undertake an authentication during the key negotiation protocol in order to enhance the security from attack of the communication link between the near field communication devices.

In a first embodiment of the method the monitoring node 2-2 merely monitors one radio channel of the radio interface. In this case the common cryptographic key between the nodes is created on a previously defined radio channel. This has the advantage of requiring little circuitry for implementing the watchdog, since only radio transmissions on the predetermined radio channel are monitored.

In an alternate embodiment the watchdog unit monitors a number of radio channels of the radio interface 3.

The radio channel is any given radio channel, for example an FDM (Frequency Division Multiplexing) radio channel, a TDM (Time Division Multiplexing) radio channel or CDM (Code Division Multiplexing) radio channel. The watchdog unit 4 monitors whether any suspect communication is taking place between one of the two nodes 2-1, 2-2 and a third node. To this end the watchdog unit 4 of the monitoring node 2-2 monitors whether key negotiation messages are being sent by a third node to one of the two nodes via the radio interface 3.

In addition the watchdog unit 4 monitors whether a generated warning message was sent out.

Furthermore, the watchdog unit 4 can monitor whether there was a drop in the quality of the radio channel during the creation of the cryptographic key in a predetermined creation period. A significant drop in the quality of the radio channel during creation procedure by comparison with a previously observed channel quality is an indication that further communication is taking place over the radio interface. A drop in the quality of the channel is especially manifests itself as an increased probability of packet loss. In a possible embodiment of the method the creation of the common cryptographic key between the two nodes is interrupted if a fault in the transmission channel, for example, the occurrence of a data packet loss, is observed by the monitoring node 2-2.

Furthermore the watchdog unit 4 can monitor whether a further node is active on the same radio channel, with this able to be detected by its address, for example a MAC address. Furthermore the watchdog unit 4 can monitor whether the actual network name (WLAN-SSID) is specified at number of Access Points, i.e. on the same or on another radio channel. There is namely the option that a node with the same network name has been set up by an attacker.

If the watchdog unit 4 detects one of the aforementioned suspect forms of communication, there is the possibility that an active attack by a third party is taking place. The above-mentioned suspect types of communication are preferably separately observed, and on occurrence of at least one suspect communication type, in one possible embodiment of the method the creation of the common cryptographic key is aborted. In an alternate embodiment the various suspect forms of communication are monitored separately and subsequently added together with a weighting when they occur. If the weighted sum value thus created exceeds a specific threshold value, in one embodiment of the method, the creation of the common cryptographic key is aborted.

In a further embodiment of the method the monitoring node additionally monitors whether a third node is communicating during the guard times before and after the creation period with one of the two nodes via the radio interface 3. The fact that monitoring also takes place before and after the actual creation period means that period which is perceived by the user as the creation phase is also protected, i.e. from the start of the creation up to its end. This prevents two or even more creation sequences following each other within a short period, i.e. barely or even not perceptible for the user. This prevents an attacker linking an attacking node firstly with the one node 2-1 and later independently with the other node 2-1. The guard time periods before and after the creation period are therefore preferably selected to be large enough to allow attacks to be easily detected, for example in the range of 1 to 5 seconds.

For implementing the guard time periods, in an embodiment of the method, timers or counters are provided in order to monitor whether suspect communication has occurred in a previous guard time period or in a subsequent guard time period. The timers or counters are preferably provided in the control unit 7 of the node.

If suspect communication is detected by the watchdog unit 4 a timer is started. This is done regardless of whether the near field communication device or the node 2 is currently in linkage operating mode or not. The result is that the radio channel is monitored before the actual linkage procedure in which the common cryptographic key is created. If a linkage procedure is initiated it can be used to ask whether, in a period predetermined beforehand by the timer, this type of suspect communication has been observed. In an embodiment the radio channel or the radio channels is or are also monitored by the watchdog unit 4 after the completion of the creation process for creating the common cryptographic key. The watchdog function remains active in this case for a predetermined period of time after the creation of the key and reports suspect types of communication. The result is that the radio channel is monitored over the entire period, which includes a particular period of time before and after the creation period for creating the cryptographic key.

In an alternate embodiment this is achieved by delays during the linkage procedure. At the beginning of the linkage procedure the radio channel is monitored for a certain period to see whether a suspect type of communication is occurring. Although this increases the time required for the linkage, the monitoring function does not have to remain active beyond the linkage phase.

If a suspect communication type occurs, in a first embodiment the key creation is aborted entirely, i.e. no common cryptographic key is created. In an alternate embodiment, the cryptographic key is still created in the event of suspicion but is stored as less trustworthy in the key store 8. The user subsequently obtains an explicit conformation by comparison or by additional authentication by means of a PIN number.

The nodes 2-1, 2-2 are embodied by near field communication devices with a relatively short range. In a preferred embodiment the near field communication devices involve WLAN, Bluetooth, ZigBee or WiMax wireless devices. Nodes 2-1, 2-2 or the wireless devices can be mobile terminals or fixed stations.

Figure 4:
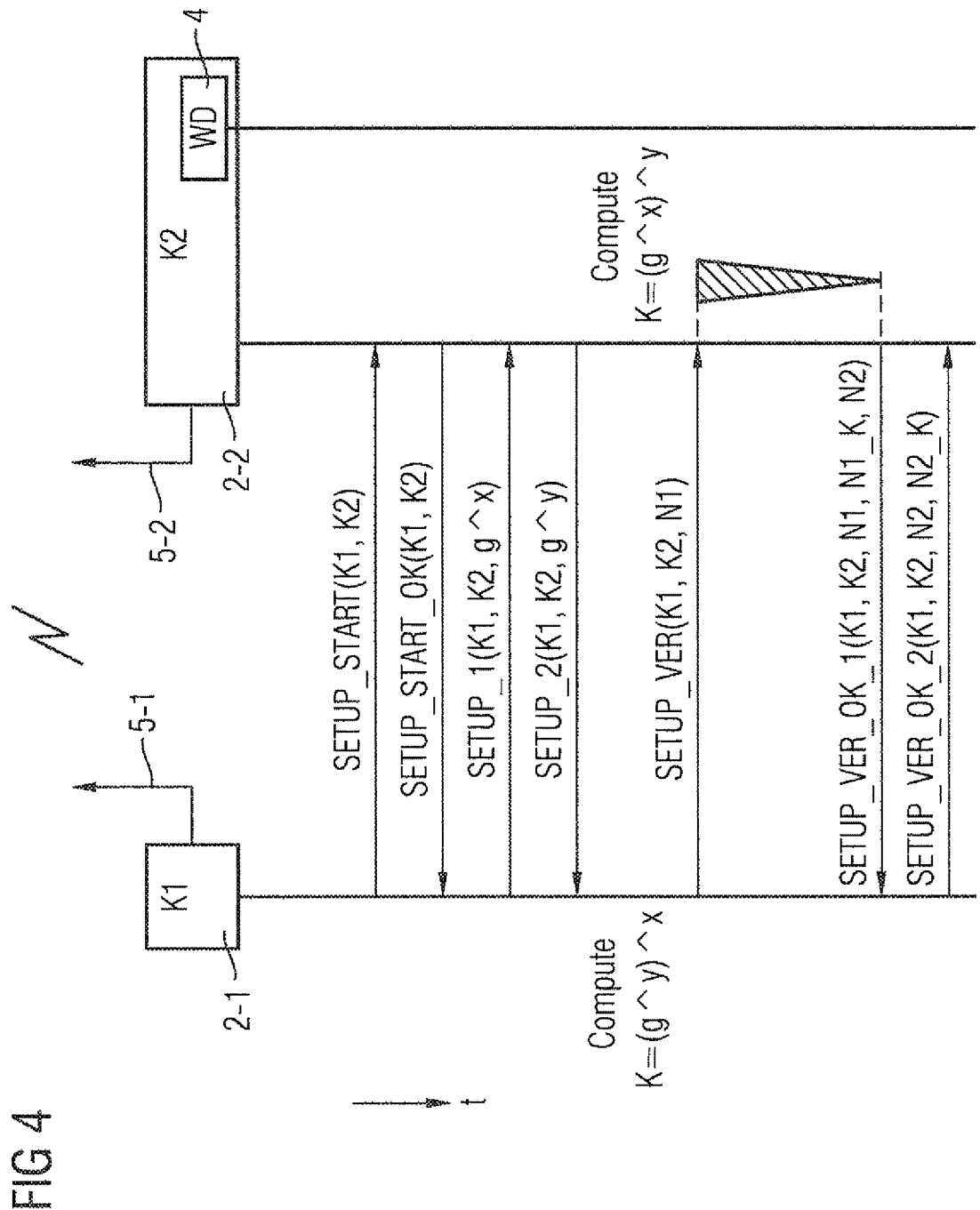
FIG. 4 is a signal diagram to explain the method for creation of a common cryptographic key without an active attack by a third party.

FIG. 4 shows a signal diagram, which depicts the creation of a common key S between two nodes 2-1, 2-2 without an active attack by a third node.

The near field communication device 2-1 or the node K1 sends a Setup_Start message to the second near field communication device 2-1 or the node K2. This is subsequently confirmed in a Setup_Start_Okay message by the second node. Subsequently the first near field communication device 2-1 sends to the second node 2-2 a value $g^x$, with g representing an integer and x a random number computed by the first node 2-1. The second node 2-2 conversely transmits to the first node 2-1 a value $g^y$, with g representing an integer known solely to both nodes and y being a random value computed by the second node 2-2. Both nodes 2-1, 2-2 subsequently compute the common Key $S=Y^x$ modm or $S=X^y$ mod m. The common cryptographic key S is subsequently stored in each case in the key store 8 of the respective node. In one possible embodiment a pseudorandom key derived from the cryptographic key, which for example has a smaller bit length, is stored in the key store 8.

Preferably checking or verification is then undertaken as to whether both nodes 2-1, 2-2 have determined the same common key. In this case, the system waits for a defined period of time during which no suspect communication may occur. To this end, a timer is used within the watchdog unit 4 of the monitoring node 2-2. After the wait time elapses the checking or verification is finished.

Numerous variations of the process depicted in FIG. 4 are possible. For example, in one embodiment the common cryptographic key can be created directly without start messages. It is further possible for the waiting time to already begin after the message "Setup 2" or after computation and storage of the key K. In a further embodiment, a period is monitored as an additional monitoring wait time which only begins after the message "Setup_Ver OK 2". In an alternate embodiment, the verification of the created common key is dispensed with entirely.

The period of time for monitoring random communications can vary within a large range. The period is selected so that in the period which the user employs to create the key, only two devices are active. Preferably a timer value in a range of appr. 1 to 5 seconds is set up.

Figure 5:
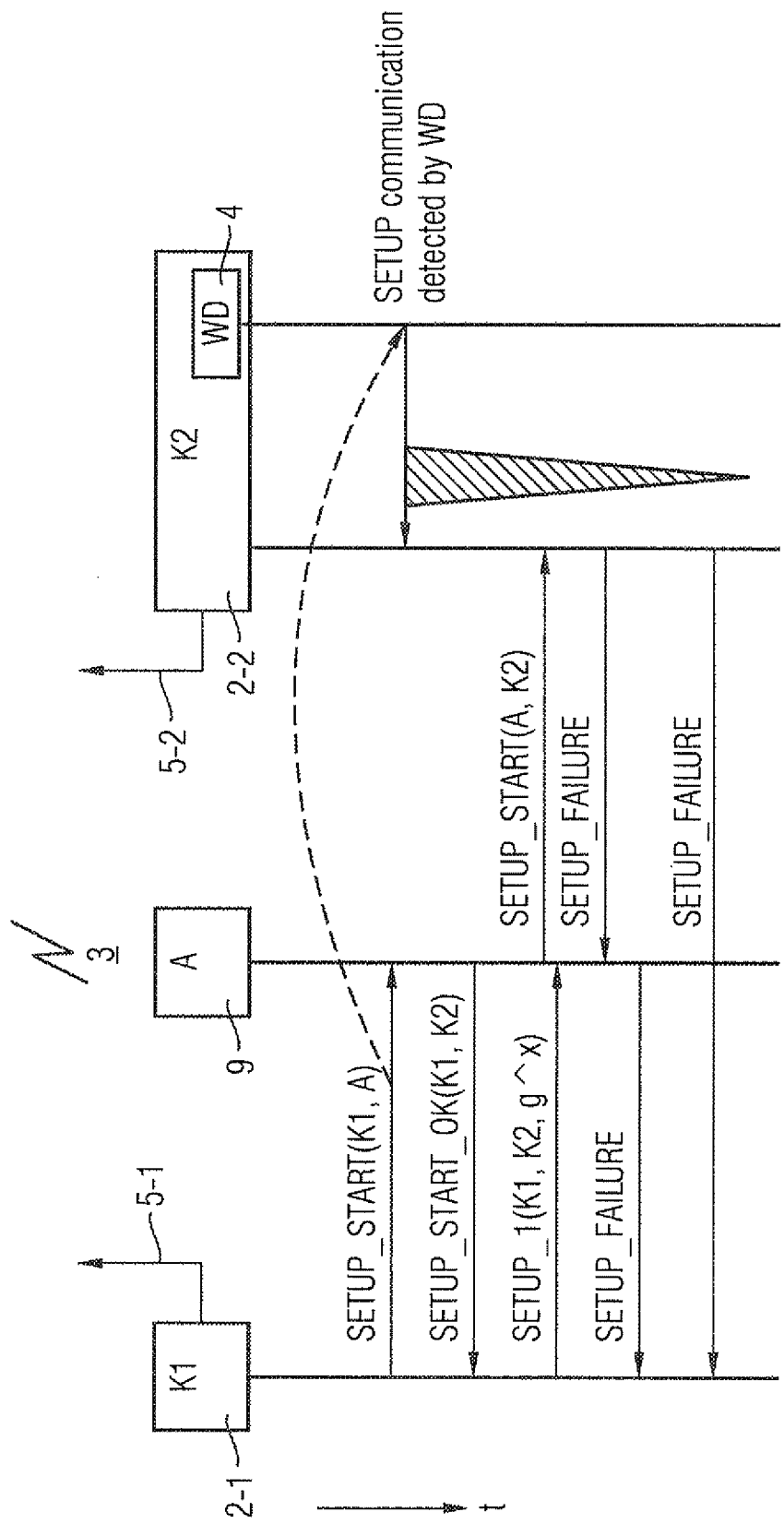
FIG. 5 is a signal diagram of the method for creation of a common cryptographic key during an active attack by a third party.

FIG. 5 shows a signal diagram during an active attack by a third party node 9, The node 2-2 can in this case not decide per se whether the node 2-1 or the third node 9 depicted in FIG. 5 is an attacking node. The watchdog unit 4 of the monitoring node 2-2 detects however that more than one node is communicating or is active over the radio interface 3. The exchange of the key negotiation protocol messages begins as shown in FIG. 4, but the creation is not between nodes 2-1, 2-2 but between the node 2-1 and the attacking node 9. However as soon as the attacking node 9 becomes active, i.e. likewise sends a Setup_Start message to the node 2-2, the watchdog unit 4 of the monitoring node detects this and signals a suspect communication. The creation of the cryptographic key is then aborted by the control unit 7 of the monitoring node 2-2. The monitoring node 2-2 only detects the suspect communication between the node 2-1 and the attacking node 9 as an error once it is also put into a mode for creating a common cryptographic key itself. Otherwise the communication between the node 2-1 and the node 9 could involve the desired creation of a key or a security relationship between the two nodes 2-1, 9. In the given example the monitoring node 2-2 is put into the mode for key creation by receiving the message "Setup_Start" (A, K2). Alternatively the node 2-2 can also be put into the setup mode or into the mode for creating the signal by a user interaction.

As soon as the control unit 7 of the monitoring node 2-2 aborts the creation of the common key, the monitoring node 2-2 sends a Setup_Failure message via its antenna 5-2 to the other node or to all nodes detected as present in a multicast program or in a broadcast program. As soon as the node 2-1 receives the Setup_Failure message from the monitoring node 2-2 it likewise aborts the process of creating the common key. In one possible embodiment the aborting of the creation process is indicated to the user by a flashing error LED for example.

The diagram shown in FIG. 5 also illustrates a timer value which measures how long an observed suspect communication has already lasted. With the observation of the suspect communication "Setup" (K1, A) in the example depicted in FIG. 5 the counter or timer is started and counted down within 1 to 5 seconds, for example. The attempt to create the key with the monitoring node 2-2 before the timer elapses leads to the error message "Setup_Failure". A suspect communication further back in time, for example 5 minutes before, does not lead to the process being aborted.

In a preferred embodiment the watchdog function of the watchdog unit 4 also remains active before and after the actual creation. If within this period of time a suspect radio signal is detected, the creation of the node is cancelled retrospectively or is rejected right from the outset with the error message "Setup_Failure". In an alternate embodiment the watchdog function is only activated at the start of creation and/or deactivated again at the end of creation. In this embodiment no timer security buffer is provided before or after the actual creation. Alternatively, however, a corresponding wait time or delay can be provided during the creation process.

A degree of additional protection can be obtained by providing short timer protection buffers. In this case, the watchdog function is only active during the actual creation and there are also no waiting times provided for the watchdog during the creation process. In this case, attacks are actively detected if they occur within the usually only short creation period, which for example only lasts for fractions of seconds.

The method significantly improves security against an active attack even with a non-secure or non-authenticated cryptographic creation method.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir 2004).

The invention claimed is:

1. A method for manipulation-protected creation of a common cryptographic key between a first node and a second node over a radio interface, comprising:
  prior to the first node sending to, or receiving from, the second node any messages related to establishing a secure key-based communication link between the first and second nodes, the first node:
    monitoring whether a third node is communicating with either of the first or second nodes via the radio interface;
    detecting a communication by the third node with the first or second node;
    in response to detecting the communication by the third node, initiating a guard period having a predefined duration;
    subsequently receiving at the first node a communication from the second node for initiating a creation of a common cryptographic key between the first and second nodes;
    if the communication from the second node is received at the first node during the guard period, the first node prohibiting the creation of the common cryptographic key; and
    if the communication from the second node is received at the first node after an expiration of the guard period, the first node entering the mode for creating a common cryptographic key and creating, by the first and second nodes in a creation period of the common cryptographic key, the common cryptographic key in accordance with a key negotiation protocol by exchanging predefined key negotiation messages via at least one radio channel of the radio interface.

2. The method as claimed in claim 1, further comprising additionally sending, by the monitoring node, an error warning message if a third node is communicating via the radio interface with one of the two nodes in the creation period.

3. The method as claimed in claim 1, further comprising monitoring, by the monitoring node, one or more radio channels of the radio interface.

4. The method as claimed in claim 1, further comprising creating, by the two nodes, common cryptographic key in accordance with a key negotiation protocol by exchanging predefined key negotiation messages via at least one radio channel of the radio interface.

5. The method as claimed in claim 4, further comprising monitoring, by the monitoring node, whether key negotiation messages are being sent by a third node to one of the two nodes via the radio interface.

6. The method as claimed in claim 1, further comprising monitoring, by the monitoring node, whether an error warning message is being sent from another node.

7. The method as claimed in claim 1, further comprising monitoring, by the monitoring node, whether a quality of a radio channel drops during the creation of the cryptographic key in the creation period.

8. The method as claimed in claim 1, further comprising additionally monitoring, by the monitoring node, whether a third node is communicating with one of the two nodes via the radio interface during a guard time after the creation period.

9. The method as claimed in claim 1, wherein the nodes are embodied by near field communication devices.

10. A method for manipulation-protected creation of a common cryptographic key between a first node and a second node over a radio interface, comprising:
  prior to the first node sending to, or receiving from, the second node any messages related to establishing a secure key-based communication link between the first and second nodes, the first node:
    monitoring whether a third node is communicating with either of the first or second nodes via the radio interface;
    detecting a communication by the third node with the first or second node;
    in response to detecting the communication by the third node, initiating a guard period having a predefined duration;
    subsequently receiving at the first node a communication from the second node for initiating a creation of a common cryptographic key between the first and second nodes;
    if the communication from the second node is received at the first node during the guard period, the first node prohibiting the creation of the common cryptographic key; and
    if the communication from the second node is received at the first node after an expiration of the guard period, the first node exchanging predefined key negotiation messages with the second node to create the common cryptographic key in accordance with a key negotiation protocol.

11. A near field communication system in which a first near field communication device and a second near field communication device are configured for creation of a common cryptographic key, the near field communication system comprising:
  a radio interface; and
  a plurality of near field communication devices including a first near field communication device and a second near field communication device, which communicate with each other via the radio interface;
  wherein the first near field communication device is configured to, prior to the first near field communication device sending to, or receiving from, the second near field communication device any messages related to establishing a secure key-based communication link between the first and second near field communication devices:
    monitor whether a third near field communication device is communicating with either of the first or second near field communication devices via the radio interface;
    detect a communication by the third near field communication device with the first or second near field communication device;
    in response to detecting the communication by the third near field communication device, initiate a guard period having a predefined duration;
    subsequently receive at the first near field communication device a communication from the second near field communication device for initiating a creation of a common cryptographic key between the first and second near field communication devices;
    if the communication from the second near field communication device is received during the guard period, the first near field communication device prohibiting the creation of the common cryptographic key; and if the communication from the second near field communication device is received after an expiration of the guard period, the first near field communication device entering the mode for creating a common cryptographic key and the first and second near field communication devices communicating with each other to create the common cryptographic key in accordance with a key negotiation protocol by exchanging predefined key negotiation messages via at least one radio channel of the radio interface.

12. A first near field communication device, comprising:
a radio interface communicating in creation of a common cryptographic key with a second near field communication device; and
a processor configured to, prior to the first near field communication device sending to, or receiving from, the second near field communication device any messages related to establishing a secure key-based communication link between the first and second near field communication devices:
   monitor the radio interface to detect a manipulation by a third near field communication device;
   detect a manipulation via the radio interface by the third near field communication device;
   in response to detecting the manipulation, initiate a guard period having a predefined duration;
   subsequently receive a communication from the second near field communication device for initiating a creation of a common cryptographic key between the first and second near field communication devices;
   if the communication from the second near field communication device is received during the guard period, prohibit the creation of the common cryptographic key; and
   if the communication from the second near field communication device is received after expiration of the guard period, enter the first near field communication device into the mode for creating a common cryptographic key and communicate with the second near field communication device via the radio interface using key negotiation messages to create the common cryptographic key.

13. A method for manipulation-protected creation of a common cryptographic key over a radio interface between two nodes of a plurality of nodes in a network,
wherein a first node includes a monitoring unit configured to monitor attempts to create common cryptographic keys between respective nodes in the network;
wherein the method comprises:
   monitoring, by the monitoring unit of the first node, prior to a creation period for creating common cryptographic key between the first node and another node, communications by at least one other node in the network via the radio interface,
   detecting, by the monitoring unit of the first node, a communication from a second node addressed to a third node,
   in response to detecting the communication from the second node addressed to a third node, starting a timer having a defined duration,
   during the duration of the timer, monitoring, at the first node, for a communication or input to the first node to put the first node into a mode for creating a common cryptographic key,
   if the communication or input to put the first node into a mode for creating a common cryptographic key is received at the first node during the timer duration, determining an error condition and transmitting at least one message to the second node to prohibit creation of a common cryptographic key between the second node and the third node, and
   in the alternative, if no communication or input to put the first node into a mode for creating a common cryptographic key is received at the first node during the timer duration, the first node allowing creation of the common cryptographic key between the second node and the third node.

* * * * *